INVENTORS
Robert F. Anderson
Allen R. Hollister
Johann F. Reuteler
BY
Delio and Montgomery
ATTORNEYS Oct. 17, 1967  R. F. ANDERSON ETAL  3,347,116
AUTOMATIC MEASURING LEAD SCREW COMPENSATOR
Filed Feb. 23, 1965  4 Sheets-Sheet 2
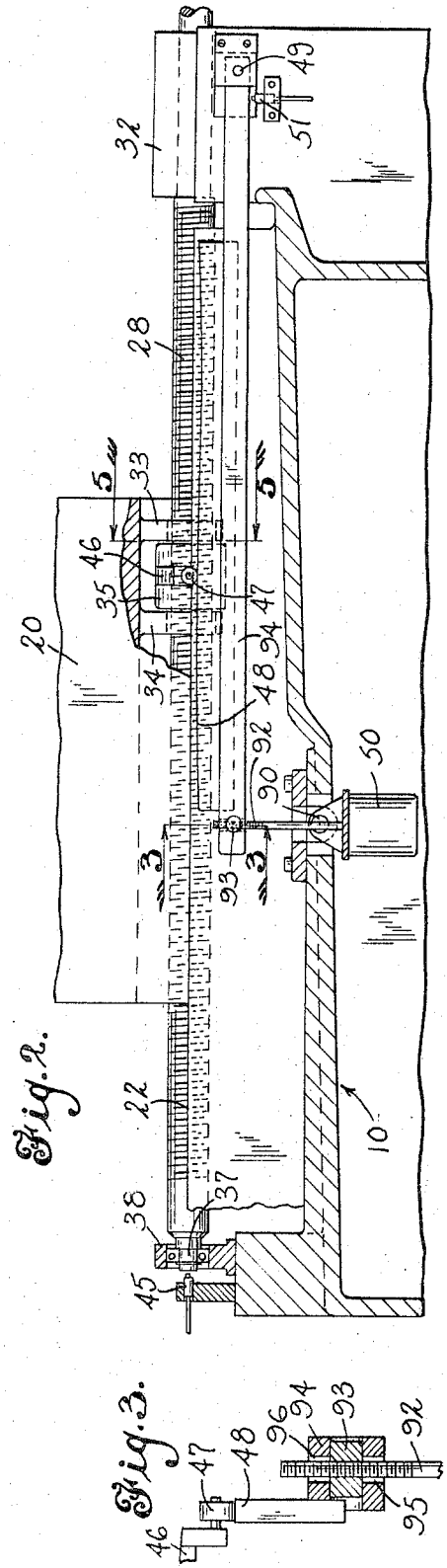
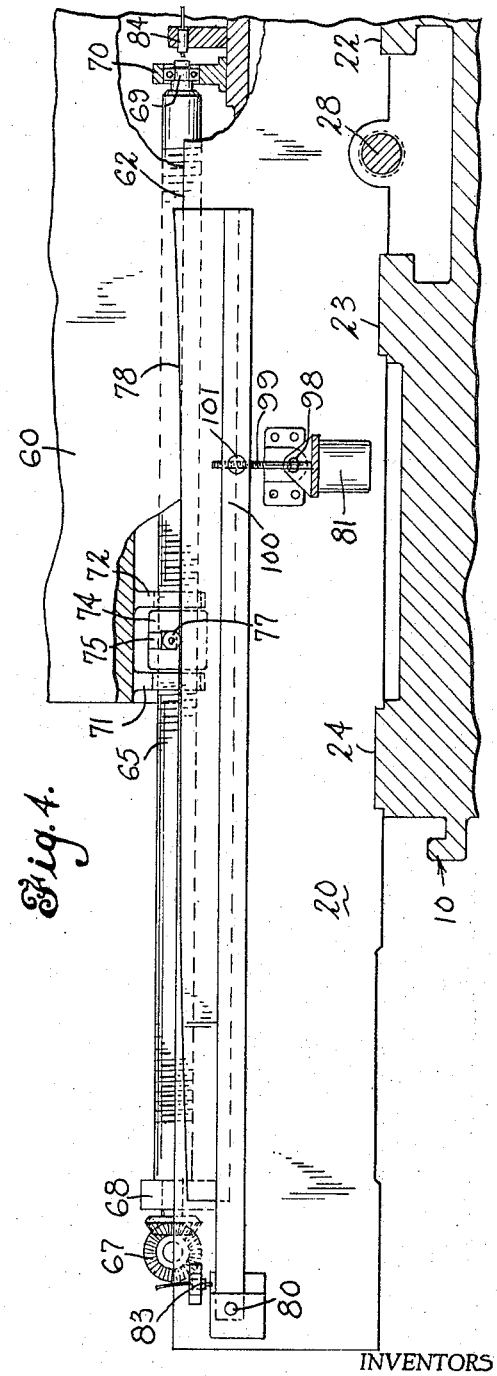
INVENTORS
Robert F. Anderson
Allen R. Hollister
Johann F. Reuteler
BY
Delio and Montgomery
ATTORNEYS

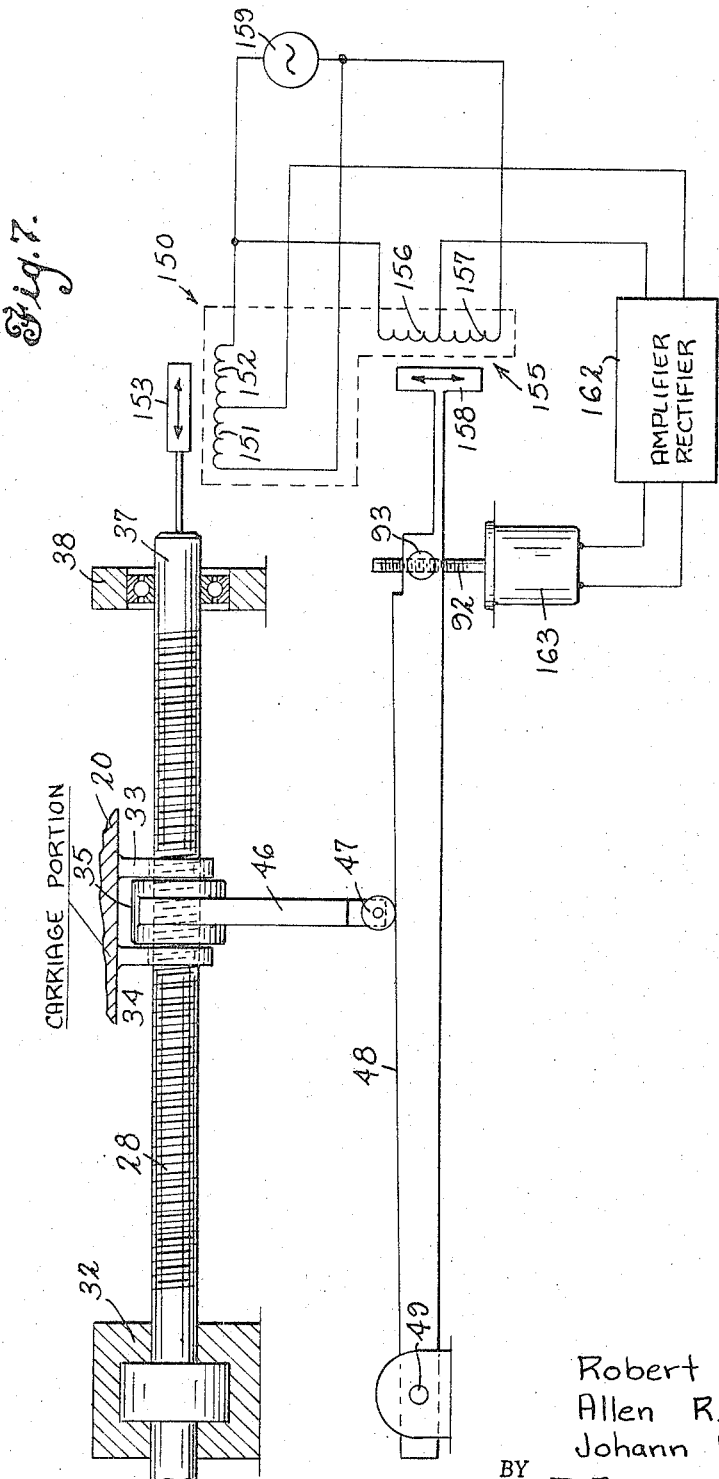

United States Patent Office 3,347,116
Patented Oct. 17, 1967

3,347,116
AUTOMATIC MEASURING LEAD SCREW COMPENSATOR
Robert F. Anderson, Simsbury, Allen R. Hollister, East Hartford, and Johann F. Reuteler, Elmwood, Conn., assignors to Pratt & Whitney Inc., West Hartford, Conn., a corporation of Delaware
Filed Feb. 23, 1965, Ser. No. 434,298
13 Claims. (Cl. 77—63)

ABSTRACT OF THE DISCLOSURE

An apparatus for compensating for the thermal expansion and contraction of a lead screw as well as for other lead screw errors. Lead screws are generally used in machine tools such as jig borers and the like and are used to accurately position a workpiece supporting member. More particularly, this invention is directed to means for sensing the change in the length of a lead screw with respect to a reference and thereafter moving the workpiece supporting member to compensate for the change in length of the lead screw.

---

The present invention relates to machine tool temperature compensation and more particularly to means for compensating for the thermal expansion of a lead screw during use of the machine tool.

During the "set up" period and prior to operating precision machine tools such as jig boring machines and the like, the workpiece is accurately positioned in the X and Y plane by first rotating the lead screw controlling the position of a carriage on the bed of the machine tool and then rotating the lead screw which accurately positions the table on the carriage. After the table and carriage are accurately positioned, the boring tool is brought into contact with the workpiece mounted on the table. During the use of the machine tool due to the resultant heat produced, the lead screws have a tendency to expand and, in so doing, errors are introduced into the system. For example, when the lead screw heats up, both the table and carriage will be displaced in the X and Y directions an amount which is significant when one is working in extremely close tolerances. This is especially true in a device wherein the lead screws are supported at one end. In this situation, the lead screws naturally tend to magnify the error at the end of the lead screw furthest from the threaded end of the lead screw.

Different means have been devised by the prior art for minimizing lead screw errors, such as the use of refrigerated lubricating systems. Other prior art has disclosed the provision of means for maintaining the dimensional stability of a lead screw in a machine tool by means of a precisely regulated temperature control system arranged to circulate a heat exchange medium internally of the lead screw with which it is operatively associated. This system requires a separate fluid pump and heat exchangers as well as a special type of lead screw.

Further, other prior art machine compensation systems which achieve positioning of the table and carriage with optical feedback devices, such as an optical disk quantizer coupled to the lead screw, do not provide a sufficiently accurate positioning of the table or carriage on the lead screw. This is due primarily to manufacturing induced lead screw errors such as helical deviation and to thermal induced lead screw errors encountered during the use of the machine.

Since economic considerations make it impracticable to fabricate lead screws with the required helical accuracy, and such means for cooling or keeping the temperature of the lead screw constant is quite costly and not particularly efficient, a new and improved, simple and economical system for correcting for both of these types of lead screw errors was required.

Accordingly, it is an object of this invention to provide a new and improved lead screw thermal and error compensation system.

Another object of the invention is to provide a lead screw compensation system which continuously adjusts for lead expansion of the lead screw.

Another object of this invention is to provide a new and improved lead screw expansion measurement system for compensating for lead screw thermal expansion.

Another object of this invention is to provide an improved temperature expansion compensation means which may be readily applied to and utilized in conjunction with existing machine tools.

Still another object of this invention is to provide for continuous lead screw temperature compensation in accordance with the continuous sensing of the expansion of the lead screw.

A further object of this invention is to provide new and improved means for compensating for lead screw errors, both systematic and random and including any helical deviation or drunkenness errors.

A still further object of this invention is to provide means for simultaneously compensating for both lead screw errors and lead screw expansion and contraction.

Other objects of the invention will in part be obvious and will in part appear hereinafter.

The invention accordingly comprises the features of construction, combination of elements and arrangements of parts which will be exemplified in the construction hereinaffter set forth and the scope of the invention will be indicated in the claims.

For a fuller understanding of the nature and objects of the invention, reference should be had to the following detailed description taken in conjunction with the accompanying drawings, in which:

FIG. 2 is a sectional view taken along line 2—2 of FIG. 1;

FIG. 3 is a sectional view taken along line 3—3 of FIG. 2;

FIG. 4 is a sectional view taken along line 4—4 of FIG 1;

FIG. 7 is a diagrammatic illustration partially in schematic of an alternate embodiment for determining lead screw expansion and for correcting the expansion.

Similar reference characters refer to similar parts throughout the several views of the drawings.

Figure 1:
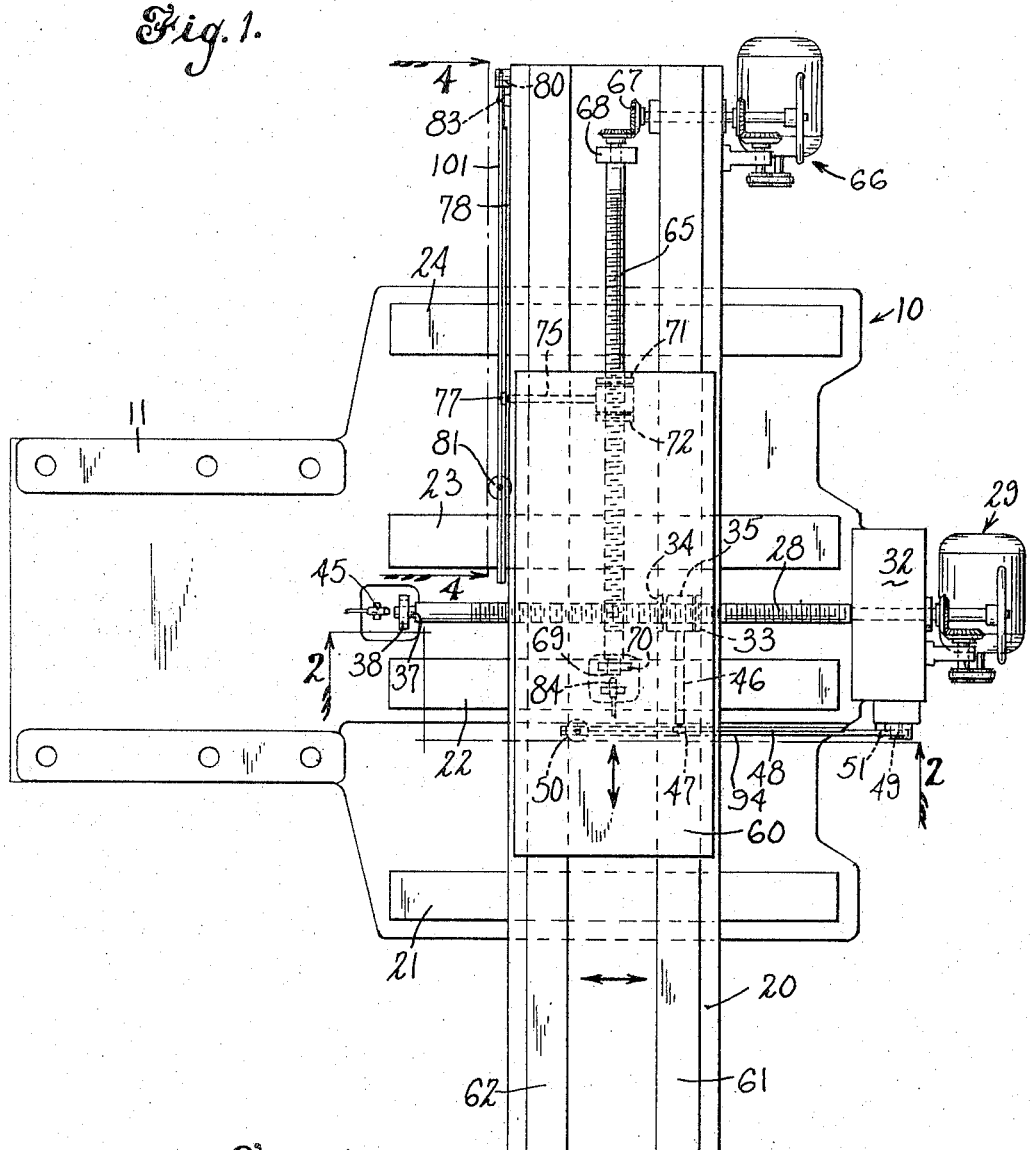
FIG. 1 is a top plan view of the positioning mechanism of a machine tool according to this invention.

Referring now to FIG. 1, there is disclosed a machine tool bed 10 having a portion 11 for mounting a pedestal which would house a boring tool, drill or other type of cutting tool. Positioned on bed 10 is a carriage 20 which is movable on ways 21 through 24. Carriage 20 is positioned along a lead screw 28 by a motor gear arrangement generally shown at 29. Lead screw 28 is supported at 32 by a bearing assembly such as a thrust bearing. The bearing may be of the Timkens type thrust and radial bearing for allowing rotation while preventing axial movement. In order to move carriage 20, a pair of legs 33 and 34 extend downward from the carriage. These legs are provided with openings of a greater diameter than the lead screw so as not to interfere with the turning of the lead screw. In order to move the carriage, a nut 35 is positioned between legs 33 and 34 and abuts said legs. By rotating the lead screw 28, nut 35 will move in a direction so as to cause legs 33 and 34 and table 20 to move in the proper direction. Lead screw 28 is provided at the end opposite fixed support 32 with an elongated, non-threaded portion 37 which is slidably mounted within a bushing 38. The slidable mounted portion 37 of lead screw 28 is free to move in bushing 38 such that during use of the machine thermal expansion of the screw will allow the lead screw to expand in a direction away from support 32.

Also shown in this figure is a back pressure responsive nozzle 45 for detecting lead screw expansion at the movable end of lead screw 28. The operation of nozzle 45 will be described at a later time in conjunction with FIG. 5. To adjust the position of carriage 20 along lead screw 28, due to thermal expansion of the lead screw, the nut 25 is provided with an arm 46 for engaging cam follower 47. Cam follower 47 is positioned on an elongated linear cam 48 which is pivoted at 49 to the end of the machine closest to fixed support 32. Motor 50 drives the cam in a direction such that arm 46 is movable in a direction perpendicular to the plane of the paper to adjust for thermal expansion of the lead screw. Also shown in this figure is a second back pressure responsive nozzle 51, positioned in proximity to cam 48 closest to the pivoted end for detection of motion of the movable cam. The operation of nozzle 51 will be described with a description of FIG. 4.

In FIG. 1 there is also shown the table 60 guided in ways 61 and 62 in carriage 20. Lead screw 65 is shown for the table and is driven by motor 66 through a beveled gear arrangement 67. The lead screw is mounted in a fixed bearing support 68 at one end. At its other end there is an elongated, non-threaded portion 69 which is supported by bushing 70 in such a manner that non-threaded lead screw portion 69 is movable within bushing support 70. Table 60 is provided with leg supports 71 and 72 extending downwardly from the table, said leg supports having enlarged holes therein so that they will not interfere with the turning of the lead screw. Positioned between and abutting said leg supports is nut 74 which is threadably engaged with lead screw 65. The nut has an elongated arm 75 which has at one end a cam follower 77. Cam follower 77 is positioned on an adjustably positioned cam 78 which is movable in a plane perpendicular to the paper. Cam 78 is pivoted at 80. To move cam 78 about its pivot point there is provided motor 81 which will be described with reference to FIG. 4. To detect either the expansion or contraction of lead screw 65, there is provided a back pressure responsive nozzle 84 at slidable end 69 of the lead screw. To obtain a reference for the motion of the lead screw, a second back pressure responsive nozzle is shown at 83 in proximity to pivot point 80 for detecting movement of cam 78. The description and function of nozzles 84 and 85 will be described with reference to FIG. 5 of the drawings.

Referring more particularly to FIG. 2, there is disclosed a motor 50 which is pivoted at 90 to the bed 10. Motor 50 has a shaft 92 for driving cam 48. This can be better seen in FIG. 3 wherein shaft 92 is threadedly engaged with a threaded pin 93 held between cam support 94. Cam support 94 is fixedly attached to cam 48 and has two holes 95 and 96 of a greater diameter than the diameter of shaft 92 so as to permit the threaded shaft to rotate freely within the support. By rotating shaft 92 in one direction, cam 48 is moved upward on the sheet of FIG. 2 and by rotating in an opposite direction the cam can be moved in the downward direction. The use of the pivoted motor 50 in conjunction with the pivoted threaded pin 93 permits cam 48 to be driven in either direction without causing excessive stresses to be applied to shaft 92 since the motor and threaded pin will turn according to the position of cam 48.

Referring now to FIG. 4, there is shown a more detailed drawing of the table and associated cam for positioning the table along the lead screw. In this figure, motor 81 is shown pivoted at 98 and having a shaft 99 which engages a pin 101 of cam support 100, said pin 101 and cam support 100 being of the same type as shown in FIG. 3. By driving motor shaft 99 in either of two directions, cam 78 can be raised upward or downward about its pivot point 80, thereby moving cam follower 77 and nut 74 to effect movement of the table 60.

Figure 5:
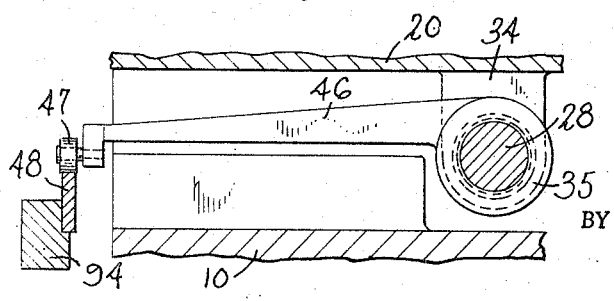
FIG. 5 is a sectional view taken along line 5—5 of FIG. 2.

In FIG. 5 there is disclosed a more detailed description of the movable nut arrangement taken along line 5—5 of FIG. 2. In this figure, leg 34 is shown with nut 35, arm 46 and cam follower 47 riding on cam 48.

From FIGS. 2 and 4, it will be specifically observed that cams 48 and 78 are preferably constructed with a variable slope along the length of the cam engaged with the cam follower. The variable slope is utilized to correct for any helical deviation including drunkenness in the lead screw. Cams 48 and 78 are ground in accordance with measurements taken along the length of the lead screw in order to provide continuous compensation for any lead screw errors. The use of this type of cam having the correction ground into it, which will retard or advance the carriage or table along the lead screw, provides continuous and initially correct positioning automatically of both the table and the carriage.

Figure 6:
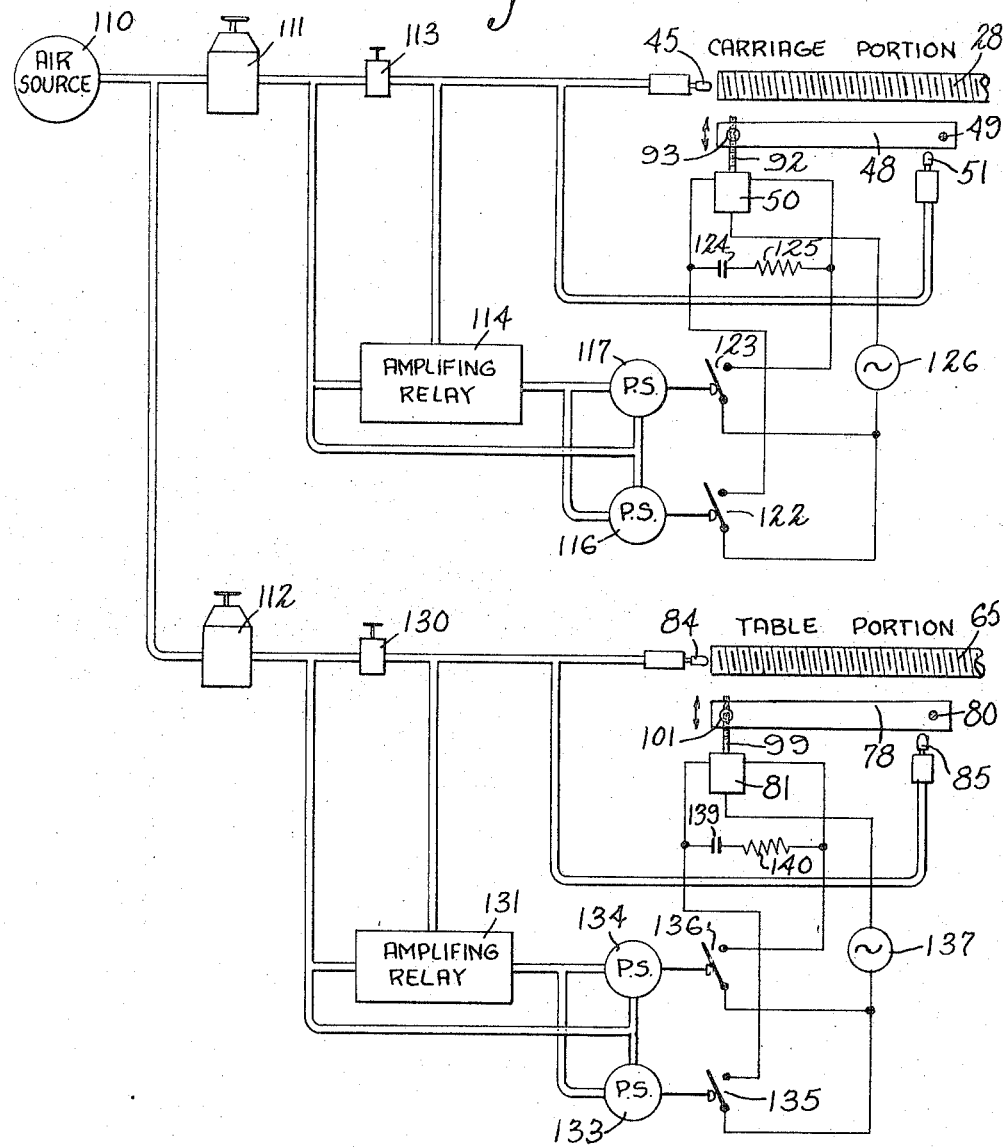
FIG. 6 is a diagrammatic illustration of the lead screw expansion measuring means according to this invention for compensating for lead screw expansion.

Referring now to FIG. 6, there is disclosed the coupling of nozzles 45 and 51, and 84 and 85 for determining the change in dimension of lead screws 28 and 65 respectively. The upper portion of FIG. 6 represents the carriage portion and the lower portion of FIG. 6 represents the table portion. The pneumatic system for determining the change in length of the lead screw comprises an air source shown at 110. Air source 110 is coupled to two pressure regulators 111 and 112 which may be adjusted in a well known manner. Pressure regulator 111 is coupled by tubing to needle valve 113 which in turn is coupled to nozzles 45 and 51 as shown. Also coupled to pressure regulator 111 is a pneumatic amplifier 114 which is coupled at one side to regulator 111 and at its input to the line coupled to both nozzles 45 and 51. The amplifying relay is a null balancing pneumatic device. Its gain is a function of the area ratios of two diaphragms. In this case, the input pressure is applied to one diaphragm with 3.7 times the area of the balancing diaphragm. A ±1 p.s.i. change in input pressure produces a ±3.7 p.s.i. change in output pressure. These types of pneumatic amplifiers may be purchased from the Moore Products Company, Philadelphia, Pa., and are Model Number 9372–29. Coupled to amplifier 114 are two pressure sensitive switches or pneumatic relays 116 and 117. The pressure relays are also coupled to pressure regulator 111 so as to provide a supply pressure to the pneumatic relay from air source 110. Pressure sensitive relay 116 includes a microswitch 123. Pressure sensitive relay 116 is spring biased, such that it will close its microswitch 122 in response to a positive change in output pressure from amplifying relay 114, and pressure sensitive relay 117 is spring biased such that it will close its microswitch in response to a negative change in output pressure provided from amplifying relay 114. When this occurs, the microswitch will close. These pressure sensitive relays may be purchased from the Moore Products Company, as Model Number 67–25. One end of microswitch 122 is coupled to one side of a first input winding of a synchronous motor 50 and microswitch 123 is coupled to a second input winding of motor 50. Coupled across the input windings are capacitor 124 and resistor 125 to effect a reversal in the direction of rotation of motor shaft 92. The common connection of the two input windings of motor 50 are coupled to an AC source 126 which is in turn coupled to both microswitches 122 and 123.

The carriage compensation portion of the system operates as follows: Assuming at first that the system is balanced, both microswitches 122 and 123 will be in the "open" position. If lead screw 28 increases in length due to a change in temperature, the back pressure nozzle 45 will provide an indication of this increase in back pressure which in turn will be transmitted to relay amplifier 114. This increase in back pressure will be amplified and relayed to pressure switches 116 and 117. Since pressure sensitive relay 116 is set to react when there is an increase in back pressure, microswitch 122 will close. This will cause motor 50 to rotate in a direction whereby the cam moves in an upward direction and thus moves the carriage in a direction to move up until the nozzle 51, which also indicates back pressure, indicates that there is a decreased back pressure due to the movement of the cam away from nozzle 51. When the two pressures indicated by both nozzles 45 and 51 when summed, once again provide a null, the microswitch contact 122 will open and thereby de-energize motor 50. In this manner, the change in length of the lead screw due to temperature is continuously compensated for. Motor 50 is preferably of the synchronous type such as sold by Superior Electric Company of Bristol, Conn., their Model Number SS25. This type of synchronous motor provides a very slow speed rotation so that the cam can be accurately positioned.

The table portion of the system is identical with the carriage portion of the system. It includes needle valve 130, relay amplifier 131, two pressure sensitive relays 133 and 134 having microswitch contacts 135 and 136 respectively. These microswitches are coupled to motor 66 and to an AC source 137. The resistor network 139 and 140 is provided across the windings of motor 66 to obtain a reverse in the direction of rotation of shaft 99 to thereby effect movement of cam 78 in both the up and down directions. The operation of the table portion of the circuit is identical to the carriage portion previously described.

Referring now to FIG. 7, there is shown an alternate embodiment for detecting change of length of a lead screw. This is an electrical analogy to the pneumatic system shown in FIG. 6. This figure illustrates the carriage portion of the device of FIG. 1 along with the alternate means for detecting and compensating for the change in length of lead screw 28. The sensing mechanism comprises a first transformer 150 including two windings 151 and 152 coupled in series with movable core 153. Core 153 is positioned on and coupled to the movable end 37 of lead screw 28 so that any increase or decrease in length of lead screw 28 will move the transformer core as shown by the arrows. Positioned in proximity to one end of cam 48 is a transformer 155 which includes a first winding 156 and a second winding 157 coupled in series. Transformer 155 includes a movable core 158 which is attached to cam 48 for motion as shown by the two-headed arrow. These two transformers 150 and 155 are coupled together into a bridge network, one end of which is coupled to a voltage source 159 and the intermediate portion of the bridge network is coupled to an amplifier-rectifier 162. Amplifier-rectifier 162 detects a change in voltage across the bridge network due to the motion of core 153. Amplifier-rectifier 162 is connected to a servo motor 163 to effect motion of shaft 92 and thereby raise or lower cam 48. The circuit operates as follows: Assuming that lead screw 28 has expanded, core 153 will move in a direction toward the right portion of the drawing. This will cause a voltage change across the bridge circuit which will be amplified and rectified to energize servo motor 163 to cause cam 148 to move in an upward direction. This moves the carriage 20 in a direction toward the left of the paper to compensate for the increase in length of the lead screw. Moving the cam in the upward direction causes the return to a no-voltage level. This occurs because core 158 moves in an upward direction on the paper to change the conductance of the coils, thereby effecting a change in the voltage across the bridge circuit. It is to be understood that many other modifications and variations on this invention could be accomplished. For example, two variable potentiometers could be utilized as a bridge circuit in place of the variable core arrangement as shown in FIG. 7. Further, by the use of pressure transducers or piezo resistive electric transducers, changes in length could be detected and compensated for in a similar manner.

It will thus be seen that the objects set forth above, among those made apparent in the foregoing description are efficiently attained and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In combination, a support, a lead screw mounted on said support, said lead screw axially secured at one end and movable at its other end, a carrier mounted on said support and positionable between the ends of the lead screw, a nut positioned on the lead screw for positioning the carrier along the lead screw, a linear cam pivotally mounted on said support in proximity to the secured end of of said screw and extending parallel to the screw for at least a portion of the length of said screw, a portion of said cam shaped to correct for errors of said screw, a cam follower coupled to said nut and in contact with the portion of said cam shaped to correct for screw errors, and means for sensing a change in length of said lead screw and for moving said cam to correct the position of said carriage along said lead screw, said means for sensing a change in length comprising first back pressure means for providing an input gas under presure, responsive means for directing said gas under presure at the movable end of said screw, second back presure responsive means for directing said gas under pressure at a portion of said cam, means for providing a first signal representative of a change in back pressure in the vicinity of said first back pressure and said second back pressure means, means responsive to said first signal and to said input gas under pressure for moving said cam to correct for a change in length of said screw.

2. A combination according to claim 1, wherein said means for moving comprises a bi-directional motor pivotally mounted to said support, having a threaded shaft coupled to a cam element connected to the free end of said cam, said cam element including a rotatable pin threadedly engaging said shaft.

3. In a machine, the combination of a lead screw, a carrier, a first means engaging said lead screw for positioning said carrier along said lead screw, second means for sensing a change of length of said lead screw, a cam, a cam follower coupled to said cam and said first means, and means for generating a signal representative of the position of the cam and the sensed length of the lead screw to control the position of the cam.

4. In a machine, the combination of a support, a lead screw mounted on said support, a carrier slidably mounted on said support, a first means engaging said lead screw for positioning said carrier along the length of said lead screw, a cam follower coupled to said first means, a cam pivoted at one end to said support and coupled to said cam follower, and second means for sensing a change in the length of said lead screw and for sensing the position of the cam and for moving said cam in accordance with a sensed change in the length of said lead screw and the sensed position of the cam.

5. In a machine, the combination of a support, a lead screw fixedly mounted at one end and slidably mounted at its other end to said support, a carrier slidably mounted on said support, a first means engaging said lead screw for positioning said carrier intermediate the ends of said lead screw, a cam follower coupled to said first means, a cam coupled to said cam follower, and second means for moving said cam in response to a change in length of said lead screw, said second means comprising third means for generating an error signal in accordance with the relative position of said cam with respect to the relative position of the slidably mounted end of said lead screw.

6. In a machine, the combination of a support, a lead screw bearingly mounted at one end and slidably mounted at its other end on said support, a carrier slidably mounted on said support, a first means engaging said screw for positioning said carrier along said screw, a cam pivotally coupled to said support in proximity to the fixedly mounted end of said screw, a cam follower coupled to said cam and said first means, second means for generating an error signal in accordance with the relative position of said slidably mounted end of said lead screw with respect to the position of said cam, and third means responsive to said error signal for moving said cam.

7. In a machine, the combination according to claim 6, wherein said cam comprises a linear cam pivoted at one end to said support, and said third means moves the unpivoted end of said cam.

8. In a machine, the combination according to claim 6, wherein said second means for generating an error signal includes a fourth means positioned in proximity to the slidably mounted end of said screw for directing gas under pressure at said slidably mounted end of said screw, a fifth means positioned in proximity to the cam for directing gas under pressure at said cam, a sixth means for supplying gas under pressure to said fourth and fifth means, and seventh means responsive to a back pressure build up in proximity to said fourth and fifth means.

9. In a machine, the combination according to claim 6, wherein said third means comprises an electric motor having a shaft rotatable in two directions, said shaft having mounted thereon means for moving said cam about said pivot end of said lead screw.

10. In a machine, the combination according to claim 6, wherein said means for generating an error signal includes a fourth means positioned in proximity to the slidably mounted end of said screw for directing gas under pressure at said slidably mounted end of said screw, a fifth means positioned in proximity to the cam for directing gas under pressure at said cam, a sixth means for supplying gas under pressure to said fourth and fifth means, and a seventh means responsive to a back pressure build up in proximity to said fourth and fifth means and to the pressure of the gas provided by said sixth means for providing a signal indicative of the relative position of said slidably mounted screw end and said cam with respect to each other.

11. In a machine according to claim 10, wherein said third means comprises a reversible motor responsive to the sign of the error signal.

12. In combination, a support, a lead screw mounted on said support, said lead screw bearingly supported at one end and movable at its other end, a carrier mounted on said support and positionable between the ends of the lead screw, a nut positioned on the lead screw for positioning the carrier along the lead screw, a linear cam pivotally mounted on said support in proximity to the secured end of said screw and extending parallel to said screw for at least a portion of the length of said screw, a portion of cam shaped to correct for drunkenness of said crew, a cam follower coupled to said nut and in contact with the portion of said cam shaped to correct for drunkenness, a bridge network including a first and second series coupled windings and third and fourth series coupled windings, said first and second windings coupled in parallel with said third and fourth windings, a first movable core positioned in proximity to said first and second windings, said core coupled to and movable with the movable end of said lead screw, a second movable core positioned in proximity to said third and fourth windings, said core coupled to and movable with said cam, means for coupling an input signal to said bridge network, means for deriving a signal indicative of an electrical imbalance in said bridge network, and means responsive to said imbalance signal for moving said cam.

13. A combination in accordance with claim 12, wherein said means for moving said cam includes a bi-directional motor pivotally coupled to said support.

References Cited

UNITED STATES PATENTS

| | | | |
|---|---|---|---|
| 2,021,537 | 11/1935 | Bath et al. | 82—5 |
| 2,309,299 | 1/1943 | Bickel | 82—5 |
| 3,212,194 | 10/1965 | Brault | 77—5 |
| 3,289,061 | 11/1966 | Stratman | 318—18 |
| 3,241,389 | 3/1966 | Brouwer | 74—424 |

FOREIGN PATENTS

| | | |
|---|---|---|
| 595,825 | 4/1934 | Germany. |

FRANCIS S. HUSAR, *Primary Examiner.*

UNITED STATES PATENT OFFICE

CERTIFICATE OF CORRECTION

Patent No. 3,347,116                         October 17, 1967

Robert F. Anderson et al.

It is hereby certified that error appears in the above numbered patent requiring correction and that the said Letters Patent should read as corrected below.

Column 2, line 36, for "hereinaffter" read -- hereinafter --; column 4, line 58, after "microswitch" insert -- 122 and pressure sensitive relay 117 includes a microswitch --; column 6, line 31, strike out "of", second occurrence; column 8, line 21, for "crew" read -- screw --.

Signed and sealed this 5th day of November 1968.

(SEAL)
Attest:

Edward M. Fletcher, Jr.                         EDWARD J. BRENNER
Attesting Officer                               Commissioner of Patents